United States Patent
Hosabettu et al.

(10) Patent No.: US 9,928,976 B2
(45) Date of Patent: Mar. 27, 2018

(54) SYSTEM AND METHOD FOR DYNAMICALLY TRIGGERING A DEVICE WITHIN A CLOSED SPACE

(71) Applicants: Raghavendra Hosabettu, Bangalore (IN); Parthasarathy Shunmugam Arumugasamy, Bangalore (IN)

(72) Inventors: Raghavendra Hosabettu, Bangalore (IN); Parthasarathy Shunmugam Arumugasamy, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 251 days.

(21) Appl. No.: 14/748,103

(22) Filed: Jun. 23, 2015

(65) Prior Publication Data
US 2016/0284487 A1    Sep. 29, 2016

(30) Foreign Application Priority Data

Mar. 28, 2015   (IN) .......................... 1603/CHE/2015

(51) Int. Cl.
| | |
|---|---|
| *G05B 19/18* | (2006.01) |
| *H01H 9/54* | (2006.01) |
| *G05B 15/02* | (2006.01) |
| *H04Q 9/00* | (2006.01) |

(52) U.S. Cl.
CPC .............. *H01H 9/54* (2013.01); *G05B 15/02* (2013.01); *H04Q 9/00* (2013.01)

(58) Field of Classification Search
CPC ............. H01H 9/54; G05B 15/02; H04Q 9/00
USPC ....................... 700/56, 91; 340/600; 702/104
See application file for complete search history.

(56) References Cited

U.S. PATENT DOCUMENTS

| | | | |
|---|---|---|---|
| 8,548,730 | B2 | 10/2013 | Miller et al. |
| 8,634,816 | B2 | 1/2014 | Xiao et al. |
| 9,203,547 | B1* | 12/2015 | Moran .................... H04K 3/415 |
| 2009/0224931 | A1 | 9/2009 | Dietz et al. |
| 2011/0183601 | A1* | 7/2011 | Hannon ................ B60K 35/00 455/1 |
| 2011/0294520 | A1 | 12/2011 | Zhou et al. |
| 2012/0231773 | A1 | 9/2012 | Lipovski |
| 2013/0029650 | A1* | 1/2013 | Xiao ..................... H04W 4/027 455/417 |
| 2013/0150004 | A1 | 6/2013 | Rosen |
| 2013/0274955 | A1 | 10/2013 | Rosenbaum |
| 2013/0303143 | A1 | 11/2013 | Schrader |

(Continued)

*Primary Examiner* — Mohammad Ali
*Assistant Examiner* — Md Azad
(74) *Attorney, Agent, or Firm* — Finnegan, Henderson, Farabow, Garrett & Dunner, LLP

(57) ABSTRACT

A system may dynamically trigger a digital device based on settings, and the device's position within a closed space, and the device's velocity. A method for triggering the digital device in a closed space may include accessing information related to the closed space and multiple sensor parameters; determining the geographic location of the device based on the multiple sensor parameters; creating a three dimensional grid coordinate system based on the information; compartmentalizing the closed space into one or more compartments based on the information; creating and accessing a user profile; determining a position of the device with respect to the one or more compartments based on the sensor parameters; and triggering the device based on at least the user profile or the position of the device.

16 Claims, 4 Drawing Sheets

(56) References Cited

U.S. PATENT DOCUMENTS

2015/0031349 A1 1/2015 Hill et al.
2015/0156567 A1* 6/2015 Oliver ................ H04Q 9/00
340/870.07

* cited by examiner

SYSTEM AND METHOD FOR DYNAMICALLY TRIGGERING A DEVICE WITHIN A CLOSED SPACE

PRIORITY CLAIM

This U.S. patent application claims priority under 35 U.S.C. § 119 to: India Application No. 1603/CHE/2015, filed Mar. 28, 2015. The entire content of the aforementioned application is incorporated herein by reference.

TECHNICAL FIELD

This disclosure relates generally to digital devices, and more particularly to system and method for dynamically triggering a digital device within a closed space based on a position of the device.

BACKGROUND

Mobile digital devices such as wireless devices, including, for example, cellular telephones, smart phones, laptop computers, notebook computers, tablet devices have become ubiquitous in recent years. With evolving lifestyles, improved technologies, and ever changing socio-economic behavior, people are increasingly using these digital devices, from where ever they are, to communicate with one another over voice and message, to consume a wide variety of digital contents, and to perform day-to-day activities. However, sometimes discourteous and dangerous misuse of digital devices outweighs their utility. For example, people often use their digital device in auditoriums, in conferences, in theatre, or while driving vehicle. Use of digital devices in auditoriums, in conferences, or in theatre may distract or cause irritation to speaker, performer, listeners, or watchers. Similarly, use of digital devices by the driver while driving vehicle may significantly distract the driver's attention from driving-related tasks and may therefore significantly increase the risk of traffic violations and driving accidents.

Many regulatory authorities have adopted rules regarding the use of digital devices while operating a vehicle or within a specific area. The rules may range from banning the use of the devices to restricting the use in some manner when in such area or while driving. The implementation of rules is hard to enforce unless there is a process or a technique in place that provides controls. Existing techniques are limited in scope while trying to deter users from usage of digital devices. For example, signal jamming techniques may be utilized to prevent the use of or block certain functionalities of the digital devices. However, the technique may block other devices besides the target device. Furthermore, jamming technique may likely interfere with the communications of more than just the targeted user(s). For example, several techniques disable any mobile device moving at a speed greater than some predetermined limit, whether or not the usage is by a driver or a passenger much to the chagrin of bus riders, subway commuters, train passengers, cab passengers and so on.

Additionally, current techniques need multiple external devices and sensors, communication mechanisms, real-time interactions with service provider, and continuous battery power for determining a driver in a vehicle or if vehicle is on move. For example, GPS based speed determination consume lot of data bandwidth and battery. Similarly, car based sensors interacting with digital devices to determine the driver and car motion involves considerable costly modification in either car or device or both. Moreover, techniques that rely on enabling or disabling certain features of the digital device based on positive human action are limited in so much so that it require positive human action.

SUMMARY

In one embodiment, a system for dynamically triggering a device within a closed space is disclosed. In one example, the system comprises a plurality of sensors and a processor. The plurality of sensors is configured to capture multiple sensor parameters. The processor is configured to access information related to the closed space and the multiple sensor parameters. The processor is further configured to compartmentalize the closed space into one or more compartments based on the information. The processor is further configured to determine a position of the device with respect to the one or more compartments based on the multiple sensor parameters. The processor is further configured to trigger the device based on the position of the device.

In one embodiment, a method for dynamically triggering a device within a closed space is disclosed. In one example, the method comprises accessing information related to the closed space and multiple sensor parameters. The method further comprises compartmentalizing the closed space into one or more compartments based on the information. The method further comprises determining a position of the device with respect to the one or more compartments based on the sensor parameters. The method further comprises triggering the device based on the position of the device.

In one embodiment, a non-transitory computer-readable medium storing computer-executable instructions for dynamically triggering a device within a closed space is disclosed. In one example, the stored instructions, when executed by a processor, cause the processor to perform operations comprising accessing information related to the closed space and multiple sensor parameters. The operations further comprise compartmentalizing the closed space into one or more compartments based on the information. The operations further comprise determining a position of the device with respect to the one or more compartments based on the sensor parameters. The operations further comprise triggering the device based on the position of the device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
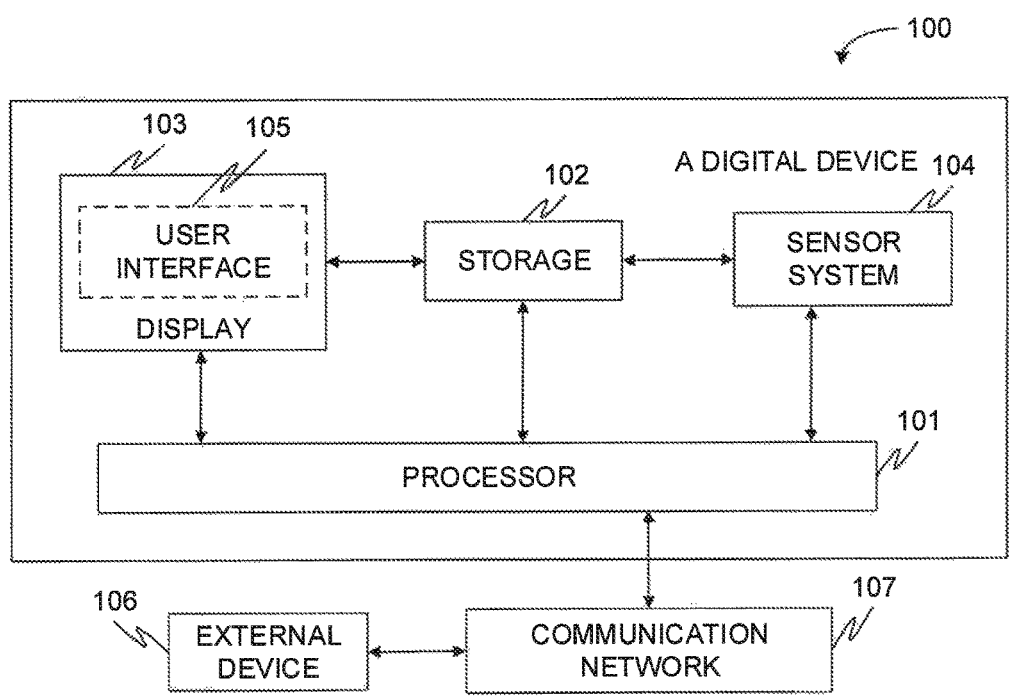
FIG. 1 is a block diagram of an exemplary system for dynamically triggering a device within a closed space in accordance with some embodiments of the present disclosure.

Referring now to FIG. 1, an exemplary system 100 for dynamically triggering a device within a closed space is illustrated in accordance with some embodiments of the present disclosure. In particular, the system 100 includes a digital device that implements a technique so as to dynamically enable or disable certain features of the device based on its position within the closed space. As will be appreciated by those skilled in the art, the closed space may be an interior space of a vehicle, an auditorium, a theatre, a conference hall, a building, and so forth. The system 100 comprises a processor 101, a storage medium (e.g., a memory) 102, a display 103, and a sensor system 104. The computer-readable storage medium 102 stores instructions that, when executed by the one or more processors 101, cause the one or more processors 101 to trigger the device based on its position within the closed space in accordance with aspects of the present disclosure. The system 100 interacts with a user via a user interface 105 accessible via the display 103. The system 100 may also interact with an external device 106 over a communication network 107 for sending or receiving data.

The sensor system 104 includes a number of sensors that captures multiple sensor parameters in real time as required by the one or more processors 101. The sensors may include, but are not limited to, a GPS sensor, an accelerometer, a gyroscope, an altimeter, a vibration sensor, a noise sensor, a proximity sensor, an infrared sensor, a camera, a microphone, a beacon, and a biometric sensor. As will be appreciated by those skilled in the art, the sensor parameters are real time measurements of ambient condition surrounding the system or the digital device. The sensor parameters may include, but are not limited to, a location of the device, a linear acceleration of the device in each of three coordinate axis, an angular velocity of the device, a position of the device, an orientation of the device, an altitude of the device, a vibration, a noise, a presence of a nearby object, an infrared signal, a motion, a heat, a camera picture, a voice, another nearby beacon, and a biometric signature. In certain embodiments, the multiple sensor parameters captured by the sensor system 104 may be stored in the storage medium 102.

The external device 106 may include, but are not limited to, a remote server, a RFID tag, a beacon, and a smart tag. In certain embodiments, the external device 106 such as the RFID tag, the beacon, and the smart tag may be installed or affixed to the closed space and may be accessible by the device using near field communication (NFC) such as radio frequency, low energy Bluetooth (BLE), and so forth. The storage medium 102 or the external device 106 may store information related to the closed space. Additionally, in certain embodiments, the storage medium 102 or the external device 106 may store regulatory or compliance information with respect to usage of the device within the closed space. The information related to the closed space may include, but are not limited to, a list of one or more closed spaces, a dimension of each of the closed space, a number of zones within each of the closed space, and a distribution of the zones within each of the closed space. Similarly, regulatory or compliance information with respect to usage of the device may include, but are not limited to, a device usage mode in each of the zones within each of the closed space, and features of the device that are enabled or disabled in a particular zone within the closed space. For example, in case of a vehicle, these information may include a database of one or more vehicles comprising at least one of a make of each of the vehicles, a model of each of the vehicles, a dimension of each of the vehicles, a number of zones (e.g., seats) in each of the vehicles, coordinates of each of the zones within each of the vehicles, device usage regulation with respect to each of the zones within each of the vehicles, and so forth.

The processor 101 is configured to access multiple sensor parameters captured by the sensor system 104 either directly or from the storage medium 102. The processor 101 is further configured to access information related to the closed space from the user via the user interface 105. Alternatively, the processor 101 is configured to access information related to the closed space from the storage medium 102 or the external device 106. In certain embodiments, the processors 101 is configured to access information related to the closed space from the storage medium 102 or the external device 106 based on an initial input received from the user via the user interface 105. Further, in certain embodiments, the processor may automatically detect the external device 106 as soon as the device is in vicinity of the external device 106 and access information related to the closed space from the external device 106.

Figure 2A:
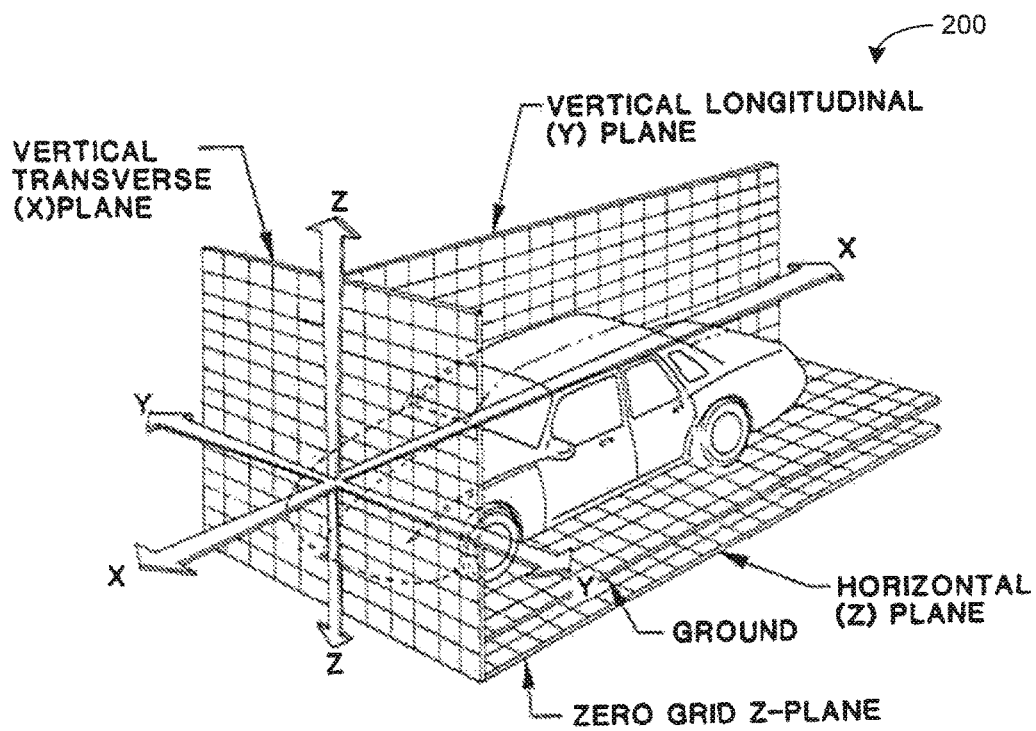
FIGS. 2A and 2B is graphical representation of compartmentalization of the closed space into one or more compartments in accordance with some embodiments of the present disclosure.
Figure 2B:
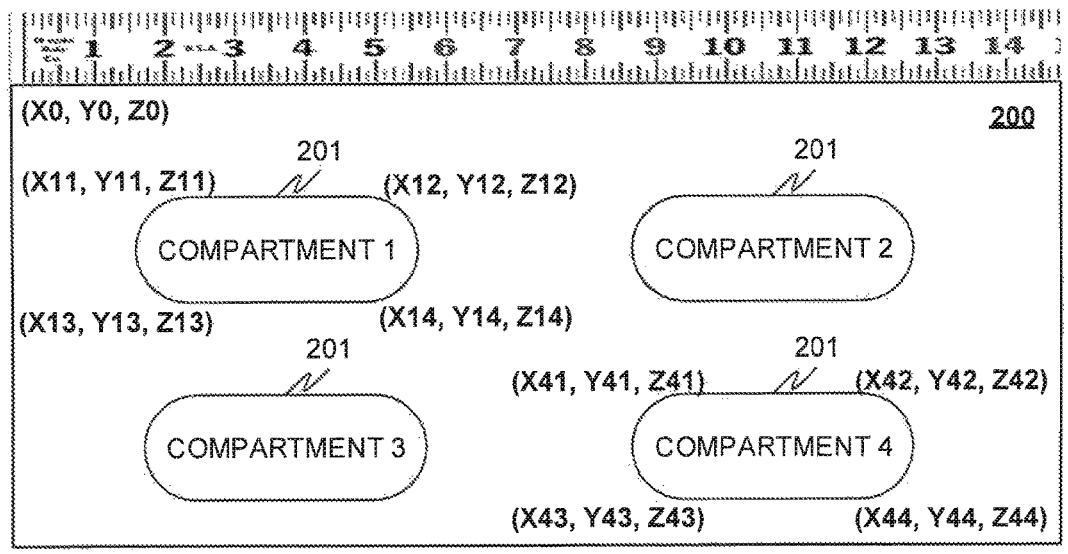

The processor is further configured to compartmentalize the closed space into one or more compartments based on the information related to the closed space. Referring now to FIGS. 2A and 2B, in certain embodiments, the processor is configured to compartmentalize the closed space 200 into one or more compartments 201 by creating grid space of the closed space 200 as depicted and identifying the one or more compartments from the grid space. For the closed space 200 having a pre-defined dimension (fixed length, width, and height) one end of the may be assigned as origin with respect to which the grid space may be created. As illustrated in FIG. 2A, a vertical transverse plane (X), a vertical longitudinal plane (Y), and a horizontal plane (Z) may then be created to form a virtual grid space mapping the closed space 200 such that each position within the closed space 200 may be identified on the grid with substantial accuracy. Further, one or more compartments may then be identified from the grid space. For example, as illustrated in FIG. 2B, closed space 200 may be compartmentalized into four compartments 201 each having a respective set of coordinates with respect to origin coordinate. As will be appreciated by those skilled in the art, compartmentalizing is not limited to cuboidal compartments but may include spherical compartments, hexagonal compartments, octagonal compartments, or any other polygonal compartments that may suit the closed space 200 or the application of the disclosed technique within the closed space 200.

The processor is further configured to determine a position of the device with respect to the one or more compartments based on the multiple sensor parameters. In certain embodiments, the processor is configured to determine the position of the device by correlating the multiple sensor parameters. For example, the position of the device inside a moving closed space such as vehicle is determined using position coordinates derived from accelerometer and gyroscope parameters. The X, Y, and Z coordinates of the device is determined from accelerometer readings while angle of placement of device is determined from gyroscope readings. As will be appreciated by those skilled in the art, for same X, Y, and Z coordinates within any compartment of the closed space, the device may be kept in specific angle or orientation. Gyroscope may therefore be employed for finding orientation of the device. Gyroscope readings may also be used to find when vehicle makes a turn and to recalibrate the accelerometer readings and the one or more compartments based on the same, thereby resulting in higher accuracy. Further, the accelerometer and gyroscope readings may be correlated with GPS readings at the start of journey and then at time or distance intervals for higher accuracy and for correcting any errors. As will be appreciated by those skilled in the art, the distance travelled may be determined using accelerometer readings and time elapsed from the start of journey. Similarly, the position of the device inside a static closed space such as building may be determined using position coordinates derived from GPS, accelerometer, altimeter, and gyroscope parameters. The processor is then configured to map the position of the device onto the one or more compartments by mapping the values between the grid space and device position. This mapping provides the position of the device with respect to one or more compartments.

Additionally, in certain embodiments, the processor is further configured to determine ON/OFF condition of the vehicle based on engine noise and vibration of the vehicle captured by noise sensor and vibration sensor respectively. Further, in certain embodiments, the processor 101 is configured to determine an event, motion of the vehicle, presence of the user inside the vehicle, and so forth using multiple sensor parameters. For example, a standard activity detection API may be employed for detecting if the vehicle is in motion and for detecting if the user is in the vehicle. Similarly, a standard API may be employed for detecting any event. As will be appreciated by those skilled in the art an application programming interface (API) is a set of routines, protocols, and tools for building software applications.

The processor 101 is further configured to trigger the device based on the position of the device with respect to the one or more compartments. In certain embodiments the processor is configured to trigger the device when the position of the device is in at least one of a pre-defined compartment of the one or more compartments. The triggering of device may include, but is not limited to, powering the device ON or OFF, providing a notification (e.g., a popup notification, a message, an alert sound, and so forth), activating or deactivating one or more features in the device, activating a customized mode of the device, and activating a regulatory mode of the device. Further, the one or more features may include, but are not limited to, a cellular service, a non-cellular signal transmitting service, and a non-cellular signal receiving service.

By way of an example with respect to a vehicle, a driver mode may be activated in the device if the device position is in driver's compartment. In this mode the position of the device in the same compartment as that of driver may indicate a possibility of usage of the device by the driver of the vehicle. The presence of the device in that particular compartment may also indicate the possible interference the device may cause to the driver. Driver mode may include a combination of emergency and useful features, which may be personalized. Such a driver mode may also include features mandated by certain country laws and may be hard set in the device. For example, driver mode could include features of network connectivity, call handling capabilities, entertainment services, and so forth. Network connectivity may include cellular services (GSM, UMTS, LTE) as well as other signal-transmitting technologies such as Wi-Fi and Bluetooth. Activation of the driver mode may disable all cellular services as well as other signal-transmitting technologies, or may keep Wi-Fi and Bluetooth enabled separately. Entertainment services may include receive-only technologies like FM radio and music or audio-video. Driver mode may disable video display on the device if the device is detected to be in the driver compartment along with combination of other factors such as status of engine ignition, speed of the vehicle, and so forth. It should be noted that receive-only technologies like FM radio and GPS may still operate if the device is so equipped. Call handling capabilities may include, receiving a call, or making a call. An incoming call may be allowed to be received depending upon the caller, device position, and status of engine ignition. Similarly, it may allow also making a call based on the combination of the device position, caller, and status of engine ignition. It may further allow a certain number of calls to be made or received when the device is in the driver compartment and the ignition is ON.

The processor 101 is further configured to create a user profile based on inputs from the user entered via the user interface 105 and store the user profile in the storage medium 102. In certain embodiments, the user profile includes customized settings with respect to activation and deactivation of one or more features of the device. For example, the user may set multiple options regarding the device including switching off device, turning off radio, placing mobile in specific mode (silent mode, driver mode, regulatory mode if country has any law specifying same), and so forth. The processor 101 may subsequently access the stored user profile from the storage medium 102 during operation based on an identification of the user. As will be appreciated by those skilled in the art, the storage medium 102 further stores user profile details and multiple sensor parameters.

In operation, the user may download an application on the digital device from a provider's server. The provider may be an automobile company, a government body, a device manufacturer, or a service provider. Alternatively, the application may be hardcoded in the device itself by the device manufacturer or hardcoded in the subscriber identification module (SIM) of the service provider. The user may optionally register with the application. The user may provide initial or full details of the closed space via the user interface 105 of the application. For example, the user may provide initial details such as make and model of the vehicle or a name of the building, theatre, auditorium, and so forth. In certain embodiments, the dimension of the closed space along with other information is then downloaded onto the device from a closed space information database residing on the provider's server based on the initial details provided by the user. For example, vehicle's dimension along with zone or seat positioning information is downloaded to the device storage medium from a vehicle information database residing on state transport department server based on make and model of the vehicle provided by the user. Further, the user may provide his preferences with respect to usage of the device within the closed space via the user interface 105 of the application. In certain embodiments, the regulatory information with respect to usage of the device within the closed space may similarly be downloaded from the provider's server. Alternatively, the downloaded or hardcoded application may communicate with an external device 106 such as a RFID tag or any other smart tag installed or affixed to the closed space using near field communication to access the details of the closed space or the regulatory information with respect to usage of the device within the closed space, or both. For example, a smart tag may be installed on the vehicle by the automobile manufacturer or by the transport department with all the details of the vehicle (make, model, dimension, zone or seat positioning) and the necessary regulatory information with respect to usage of the device within the vehicle. The installed application on the device may communicate with the smart tag as soon as the device is in the vicinity of the tag to access the information from the smart tag.

The application may further access multiple sensor parameters such as accelerometer reading, gyroscope reading, GPS reading, altimeter reading, and so forth captured by the sensors in the device. The application may then compartmentalize the closed space into one or more compartments based on the accessed information as described above. For example, a four seater vehicle may be compartmentalized into two or four compartments depending on the regulation with respect to usage of the device in the vehicle. If the regulation restricts usage of the device for both driver as well as co-passenger in the front seats then the vehicle may be compartmentalized into two compartments. However, if the regulation restricts usage of the device only for the driver then the vehicle may be compartmentalized into four compartments. Similarly, in an auditorium or a conference hall, front rows, middle rows, and back rows may be compartmentalized into three separate compartments. The application may then determine a position of the device with respect to the one or more compartments based on the multiple sensor parameters as described above. For example, the device may be positioned in driver's compartment in the vehicle or in the front row compartment in the auditorium. Finally, the application may trigger the device based on the position of the device with respect to the one or more compartments. The triggering is based on options or preferences provided by the user to the application or based on the regulatory information accessed by the application from the storage medium, remote server, or smart tag. For example, depending on the regulation, the driver's device is triggered to disable all cellular service and non-cellular signal transmitting services while keeping enabled non-cellular signal receiving services. Additionally, video playback applications on the device may be disabled. The co-passenger on the front seat may have all cellular service and video playback applications on the device disabled while the rest of the services are enabled. The passengers on the back seats may have all features enabled.

As will be appreciated by one skilled in the art, a variety of processes may be employed for dynamically triggering the device within the closed space. For example, the exemplary system 100 may dynamically trigger the device within the closed space by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
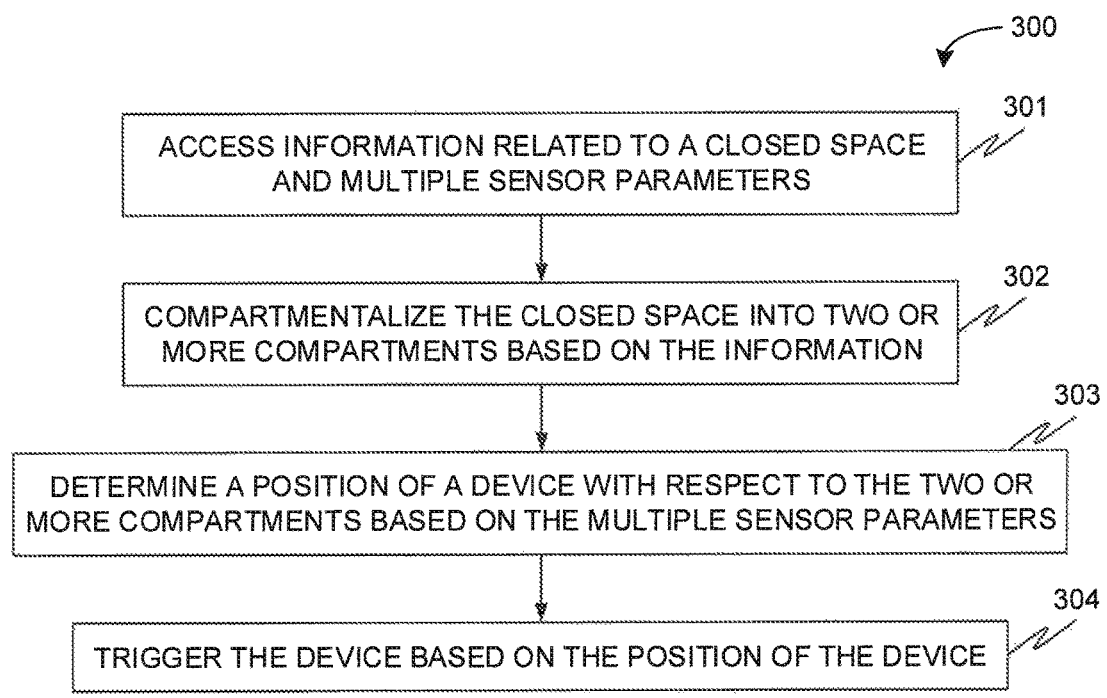
FIG. 3 is a flow diagram of an exemplary process for dynamically triggering a device within a closed space in accordance with some embodiments of the present disclosure.

For example, referring now to FIG. 3, exemplary control logic 300 for dynamically triggering the device within the closed space via a system, such as system 100, is depicted via a flowchart in accordance with some embodiments of the present disclosure. As illustrated in the flowchart, the control logic 300 includes the steps of accessing information related to the closed space and multiple sensor parameters at step 301, compartmentalizing the closed space into one or more compartments based on the information at step 302, determining a position of the device with respect to the one or more compartments based on the sensor parameters at step 303, and triggering the device based on the position of the device at step 304. In some embodiments, the control logic 300 may further include the step of creating a user profile based on inputs from a user and storing the user profile. Thus, the control logic 300 may be employed to create and save multiple profiles for same or different users.

In some embodiments, accessing the information at step 301 further comprises accessing the information from a user via a user interface or accessing the information from a database or both. Further, in some embodiments, compartmentalizing the closed space at step 302 comprises creating grid space of the closed space, and identifying the one or more compartments from the grid space. Additionally, in some embodiments, determining the position at step 303 comprises mapping the position of the device onto the one or more compartments. Determining the position at step 303 may further comprise correlating the multiple sensor parameters. Moreover, in some embodiments, triggering at step 304 comprises triggering the device when the position of the device is in at least one of a pre-defined compartment of the one or more compartments.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
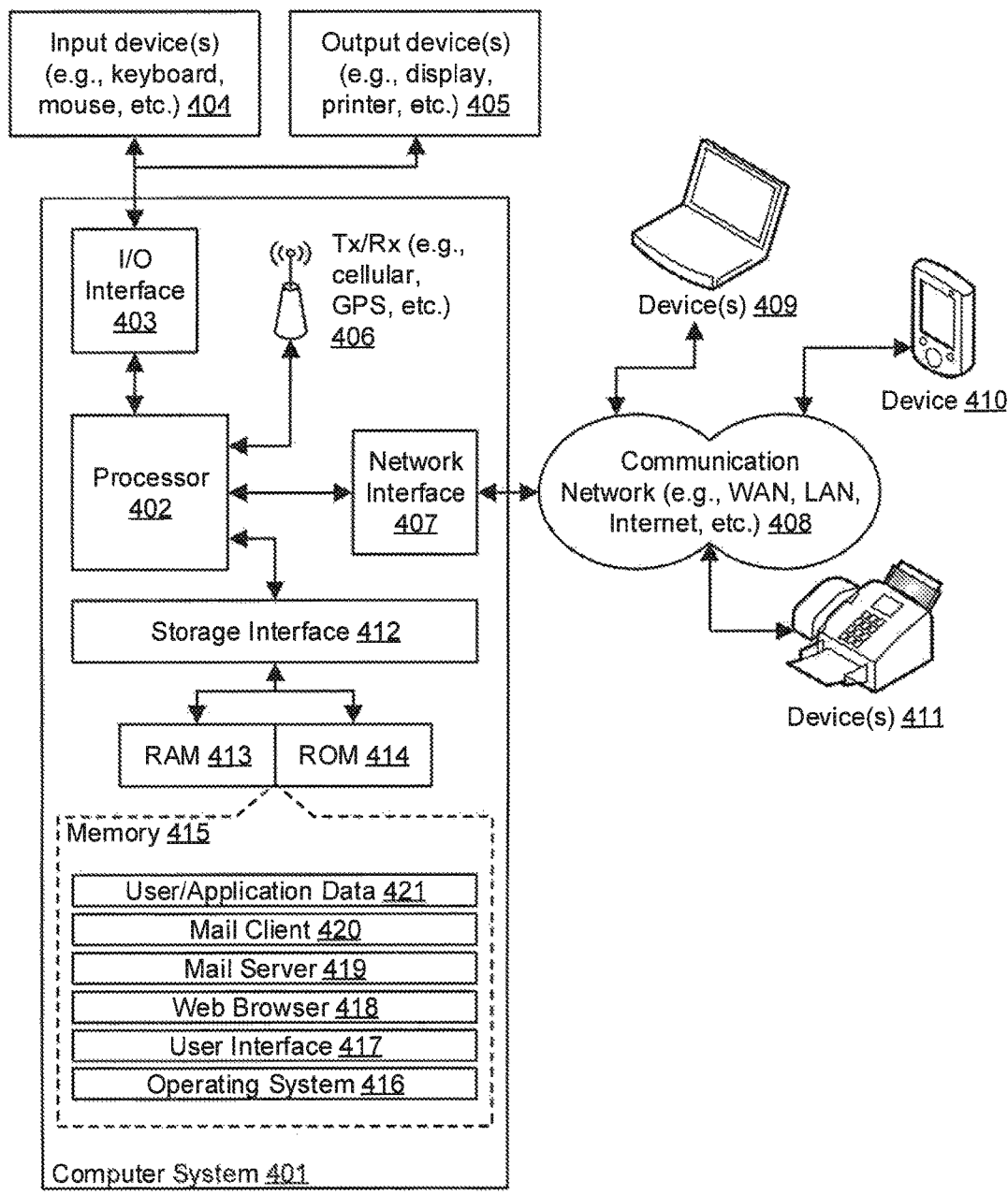
FIG. 4 is a block diagram of an exemplary computer system for implementing embodiments consistent with the present disclosure.

Referring now to FIG. 4, a block diagram of an exemplary computer system 401 for implementing embodiments consistent with the present disclosure is illustrated. Variations of computer system 401 may be used for implementing system 100 for dynamically triggering the device within the closed space. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., sensor parameters, user profiles, dimension of the closed space, grid space corresponding to the closed space, coordinates of compartments, features that need to be enabled or disabled for each compartments, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for dynamically triggering of a digital device based on its position within the closed space. The techniques result in higher accuracy as the position of the device within the closed space is based on a combination of multiple sensor parameters rather than only GPS. Further, the techniques described in the embodiments discussed above provide for triggering of the digital devices of only a target group of users (e.g., driver's device) while leaving digital devices of users outside the target group (e.g., passenger's device) as it is.

The specification has described system and method for dynamically triggering the device within the closed space. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for dynamically triggering a device within a closed space, the system comprising:
   a plurality of sensors configured to capture multiple sensor parameters; and
   a processor configured to:
      access information related to the closed space and the multiple sensor parameters;
      determine the geographic location of the device based on at least one of the multiple sensor parameters;
      access information related to the geographic location of the device;
      create a three-dimensional grid coordinate system of the closed space based on the information related to the closed space;
      compartmentalize the closed space into one or more compartments based on the information and the three-dimensional coordinate system;
      determine a position of the device with respect to the one or more compartments and the three-dimensional coordinate system based on the multiple sensor parameters;
      create and access a user profile based on inputs from a user and on default settings, wherein the user profile comprises customized settings with respect to activation and deactivation of one or more features of the device when the device is in at least one of the one or more compartments; and
      trigger the device based on at least one of the position of the device, geographic location of the device, and the customized user profile;
   wherein the processor is configured to trigger the device by at least one of powering the device ON or OFF, providing a notification, activating or deactivating one or more features in the device, activating a customized mode of the device, and activating a regulatory mode of the device; and
   wherein the regulatory mode comprises settings based on the geographic location of the device wherein the settings are not customizable with respect to activation and deactivation of one or more features of the device when the device is in one of the one or more compartments.

2. The system of claim 1, wherein the plurality of sensors comprises a GPS sensor, an accelerometer, a gyroscope, and an altimeter.

3. The system of claim 1, wherein the multiple sensor parameters comprises a location of the device, a linear acceleration of the device in each of three coordinate axis, an angular velocity of the device, and an altitude of the device.

4. The system of claim 1, wherein the processor is configured to access the information by accessing the information from a storage medium and from an external source over a communication network.

5. The system of claim 1, wherein the closed space comprises an interior space of an automobile, and wherein the information comprises a make of the automobile, a model of the automobile, a dimension of the automobile, and coordinates of each of a plurality of zones of the automobile.

6. The system of claim 1, wherein the processor is configured to determine the position of the device by correlating the multiple sensor parameters.

7. The system of claim 1, wherein the one or more features comprises at least one of one or more cellular services, one or more non-cellular signal transmitting services, one or more non-cellular signal receiving services.

8. The system of claim 1, where in the information related to the geographic location of the device comprises regulatory rules.

9. A method for dynamically triggering a device within a closed space, the method comprising:
- accessing, via the processor, information related to the closed space and multiple sensor parameters;
  - determining, via the processor, the geographic location of the device based on at least one of the multiple sensor parameters,
    - accessing, via the processor, information related to the geographic location of the device;
- creating, via processor, a three-dimensional grid coordinate system of the closed space based on the information related to the closed space;
- compartmentalizing, via the processor, the closed space into one or more compartments based on the information and the three-dimensional coordinate system;
- determining, via the processor, a position of the device with respect to the one or more compartments and the three-dimensional coordinate system based on the sensor parameters;
- creating and accessing, via the processor, a user profile based on inputs from a user and on default settings, wherein the user profile comprises customized settings with respect to activation and deactivation of one or more features of the device when the device is in one of the one or more compartments; and
- triggering, via the processor, the device based on at least one of the position of the device, geographic location of the device, and the customized user profile;
- wherein triggering the device comprises at least one of powering the device ON or OFF, providing a notification, activating or deactivating one or more features in the device, activating a customized mode of the device, and activating a regulatory mode of the device; and
- further wherein the regulatory mode comprises settings based on the geographic location of the device wherein the settings are not customizable with respect to activation and deactivation of one or more features of the device when the device is in one of the one or more compartments.

10. The method of claim 9, wherein accessing the information comprises accessing the information from a database and from an external source over a communication network.

11. The method of claim 9, wherein the information related to the geographic location of the device comprises regulatory rules.

12. The method of claim 9, wherein the one or more features comprises at least one of one or more cellular services, one or more non-cellular signal transmitting services, one or more non-cellular signal receiving services.

13. The method of claim 9, wherein the closed space comprises an interior space of an automobile, and wherein the information comprises a make of the automobile, a model of the automobile, a dimension of the automobile, and coordinates of each of a plurality of zones of the automobile.

14. A non-transitory computer-readable medium storing computer-executable instructions that, when executed by one or more processors, cause the one or more processors to perform a method, the method comprising:
- accessing information related to a closed space and multiple sensor parameters;
- determining the geographic location of the device based on at least one of the multiple sensor parameters,
- accessing information related to the geographic location of the device;
- creating a three-dimensional grid coordinate system of the closed space based on the information related to the closed space;
  - compartmentalizing the closed space into one or more compartments based on the information and the three-dimensional coordinate system;
- determining a position of the device with respect to the one or more compartments and the three-dimensional coordinate system based on the multiple sensor parameters;
- creating or accessing a user profile based on inputs from a user and on default settings, wherein the user profile comprises customized settings with respect to activation and deactivation of one or more features of the device when the device is in at least one of the one or more compartments; and
- triggering the device based on at least one of the position of the device, geographic location of the device, and the customized user profile
- wherein triggering the device comprises at least one of powering the device ON or OFF, providing a notification, activating or deactivating one or more features in the device, activating a customized mode of the device, and activating a regulatory mode of the device; and
- wherein the regulatory mode comprises settings based on the geographic location of the device wherein the settings are not customizable with respect to activation and deactivation of one or more features of the device when the device is in one of the one or more compartments.

15. The medium storing computer-executable instructions of claim 14, wherein the one or more features comprises at least one of one or more cellular services, one or more non-cellular signal transmitting services, one or more non-cellular signal receiving services.

16. The medium storing computer-executable instructions of claim 14, wherein the closed space comprises an interior space of an automobile, and wherein the information comprises a make of the automobile, a model of the automobile, a dimension of the automobile, and coordinates of each of a plurality of zones of the automobile.

* * * * *

UNITED STATES PATENT AND TRADEMARK OFFICE
CERTIFICATE OF CORRECTION

PATENT NO. : 9,928,976 B2
APPLICATION NO. : 14/748103
DATED : March 27, 2018
INVENTOR(S) : Raghavendra Hosabettu et al.

Page 1 of 1

It is certified that error appears in the above-identified patent and that said Letters Patent is hereby corrected as shown below:

In the Claims

Claim 8, Column 13, Line 5, "where in" should read --wherein--.

Signed and Sealed this
Seventeenth Day of July, 2018

Andrei Iancu
*Director of the United States Patent and Trademark Office*